(12) United States Patent
Gorun et al.

(10) Patent No.: US 9,260,630 B2
(45) Date of Patent: Feb. 16, 2016

(54) SELF-CLEANING PROTECTIVE COATINGS

(71) Applicant: Porter Scientific, Inc., Pembroke, NC (US)

(72) Inventors: Sergiu M. Gorun, Montclair, NJ (US); James Sullivan, Caldwell, NJ (US); Karpagavalli Ramji, Newark, NJ (US)

( * ) Notice: Subject to any disclaimer, the term of this patent is extended or adjusted under 35 U.S.C. 154(b) by 0 days.

(21) Appl. No.: 14/677,186

(22) Filed: Apr. 2, 2015

(65) Prior Publication Data

US 2015/0284592 A1    Oct. 8, 2015

Related U.S. Application Data

(60) Provisional application No. 61/974,719, filed on Apr. 3, 2014.

(51) Int. Cl.
| | |
|---|---|
| *C09D 183/04* | (2006.01) |
| *B01J 35/00* | (2006.01) |
| *B01J 21/06* | (2006.01) |
| *C09D 7/12* | (2006.01) |
| *B32B 27/28* | (2006.01) |
| *C08K 5/3417* | (2006.01) |

(52) U.S. Cl.
CPC ............ *C09D 183/04* (2013.01); *B01J 21/063* (2013.01); *B01J 35/004* (2013.01); *B32B 27/283* (2013.01); *C08K 5/3417* (2013.01); *C09D 7/1225* (2013.01)

(58) Field of Classification Search
None
See application file for complete search history.

(56) References Cited

U.S. PATENT DOCUMENTS

| | | | | |
|---|---|---|---|---|
| 5,486,274 A | * | 1/1996 | Thetford | ............... A61K 31/40 204/157.5 |
| 7,628,849 B1 | * | 12/2009 | Diehl | ................... C07F 7/0836 106/410 |
| 2006/0234060 A1 | * | 10/2006 | Gorun | ................. C08K 5/0091 428/411.1 |
| 2013/0064712 A1 | * | 3/2013 | Roder | .................. A61K 31/409 422/29 |
| 2015/0266011 A1 | * | 9/2015 | Griswold | ................ B01J 31/38 502/154 |

OTHER PUBLICATIONS

Abstract for an article entitled "Fluorophilic Cobalt Phthalocyanine-containing Nafion Membrane: High Oxygen Permeability and Proton Conductivity in the Membrane" authored by Shoji et al. and published in Polymer Advanced Technologies (2010) 21, 646-650.*

"Immobilization and Catalytic Properties of Perfluorinated Ruthenium Phthalocyanine Complexes in MCM-41-type Molecular Sieves" authored by Ernst et al. and published in Microporous and Mesoporous Materials (1999) 27, 355-363.*

"Enhancement of Photocatalytic Degradation of Polyethylene Plastic with CuPc-modified TiO2 Photocatalyst under Solar Light Irradiation" authored by Zhao et al. and published in Applied Surface Science (2008) 254, 1825-29.*

"Enhancement of Photocatalytic Degradation of Poly(vinyl chloride) with Perchlorinated Iron (II) Phthalocyanine-modified Nano TiO2" authored by Fa et al. and published in the Journal of Applied Polymer Science (2011) 122, 1823-1828.*

* cited by examiner

*Primary Examiner* — Marc Zimmer

(57) ABSTRACT

Coating compositions that include a halopigment dispersed within a silicon-containing polymeric matrix (e.g., a polysiloxane polymer) are provided. The halopigment comprises a halogenated phthalocyanine (e.g., a fluorinated phthalocyanine) attached to a support particle (e.g., a metal oxide, a non-metal oxide, and/or an inert material). The halogenated phthalocyanine can have the formula: $(16R-Pc)_n ML_o$, where each R is, independently, a halogen or a perhaloalkyl group, with each R group being independent from the other groups; Pc is a phthalocyanine compound; $1 \leq n \leq 2$; L is a ligand or ligands and M is a cation; and $0 \leq o \leq 8$. Methods are also provided for forming such a coating composition and for coating a substrate with the coating composition.

20 Claims, 4 Drawing Sheets

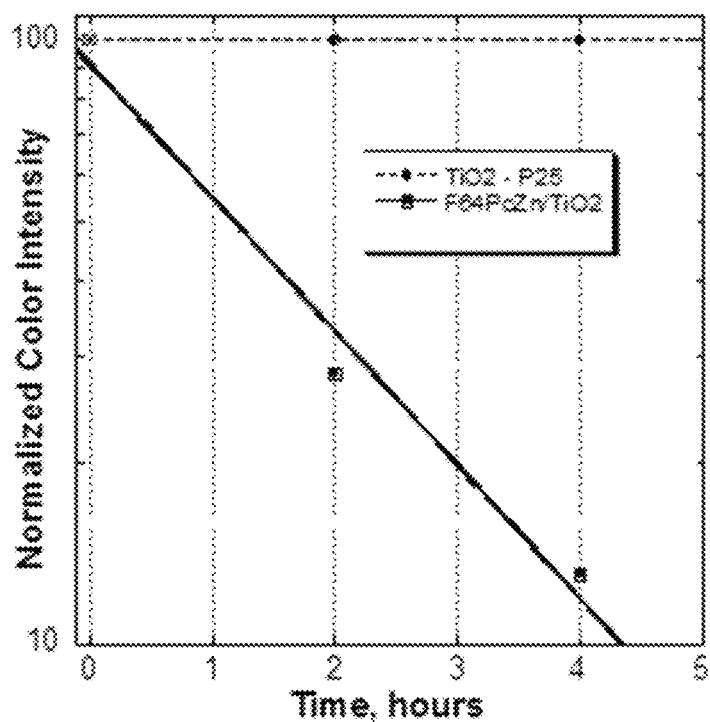
*Fig. 2*
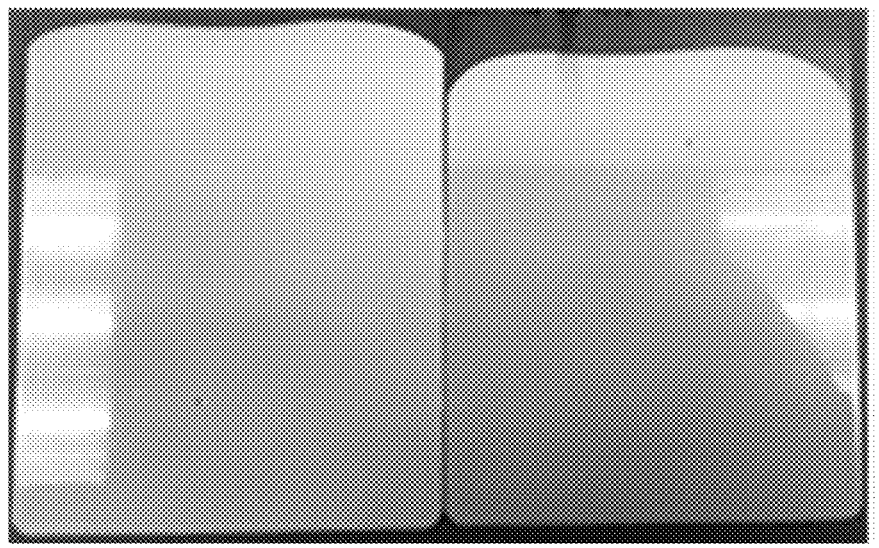
*Fig. 3A*          *Fig. 3B*

US 9,260,630 B2

SELF-CLEANING PROTECTIVE COATINGS

PRIORITY INFORMATION

The present application claims priority to U.S. Provisional Patent Application Ser. No. 61/974,719 titled "Self-Cleaning Protective Coatings" of Gorun, et al. filed on Apr. 3, 2014, the disclosure of which is incorporated by reference herein.

GOVERNMENT SUPPORT CLAUSE

This invention was made with government support under FA8501-13-C-0024 awarded by U.S. Air Force. The government has certain rights in the invention.

FIELD OF THE INVENTION

The present invention generally relates to new coating compositions and their subsequent deposition on a substrate. More specifically, the coatings are photocatalytic imparting to the surface self-cleaning properties. Even more specific, the coatings contain a halogenated phthalocyanine attached to support particles (i.e., halopigments) dispersed within a polysiloxane binder.

BACKGROUND

Titanium dioxide is a semiconductor that has the property of exhibiting charge separation upon illumination with near-UV or ultraviolet (UV) radiation. Upon illumination, electrons are promoted from the valence band to the conduction band creating reactive electron-hole pairs that reduce oxygen to produce superoxide radicals and oxidize adsorbed water to produce reactive hydroxyl radicals, respectively. The holes have radical-cation character. All radicals have the ability to degrade the C—H bonds of organic compounds, mildew, mold, algae, grease, etc., thus imparting cleaning and self-cleaning properties to the oxide. As such, the incorporation of $TiO_2$ into certain coatings will result in coatings that advantageously will retain self-cleaning properties.

The importance of clean coatings extends into corrosion aspects since organic and biological molecules attached to a surface can generate acids and other substances that, unless removed, can favor the onset of corrosion and/or biological corrosion of metal surfaces. Organic molecules attached to $TiO_2$ may have beneficial effects on certain properties that relay upon charge separations, for example for solar energy conversion, but regular organic molecules are inefficient since they themselves contain C—H bonds, and thus are subject to degradation by radicals.

It should be noted that several publications provide compositions that include photocatalytic $TiO_2$, such as WO2005/083014, WO 2006/030250, WO 2005/083013 and U.S. Pat. No. 8,475,581. However, inorganic $TiO_2$ represents a fundamentally different composition of matter, with different physical and chemical properties, as well as photocatalytic properties compared with the organic fluoropigments of the current invention. This information is presented only in order to provide a better and complete understanding of the advantages of the present invention. It should not be viewed as a citation of prior art to the instant application.

SUMMARY

Objects and advantages of the invention will be set forth in part in the following description, or may be obvious from the description, or may be learned through practice of the invention.

Coating compositions are generally provided that include a halopigment dispersed within a silicon-containing polymeric matrix (e.g., a polysiloxane polymer). The halopigment comprises a halogenated phthalocyanine (e.g., a fluorinated phthalocyanine) attached to a support particle (e.g., a metal oxide, a non-metal oxide, and/or an inert material). In one embodiment, the halogenated phthalocyanine is free from carbon-hydrogen covalent bonds. The halogenated phthalocyanine has, in one particular embodiment, the formula:

$$(16R\text{-}Pc)_n ML_o$$

where: each R is, independently, a halogen or a perhaloalkyl group, with each R group being independent from the other groups; Pc is a phthalocyanine compound; $1 \leq n \leq 2$; L is a ligand or ligands and M is a cation; and $0 \leq o \leq 8$.

A coated substrate is also generally provided that includes a substrate defining a first surface; and a coating applied onto the first surface, where the coating comprises the dried coating composition described above.

Methods are also generally provided for forming a coating composition. In one embodiment, the method comprises: dissolving a halogenated phthalocyanine in a solvent to form a solution; adding a plurality of support particles into the solution; thereafter, evaporating the solvent from the solution to form a plurality of halopigments; and dispersing the halopigment within a silicon-containing polymeric matrix. The halopigments comprise the halogenated phthalocyanine attached to the support particle.

Other features and aspects of the present invention are discussed in greater detail below.

BRIEF DESCRIPTION OF THE DRAWINGS

A full and enabling disclosure of the present invention, including the best mode thereof to one skilled in the art, is set forth more particularly in the remainder of the specification, which includes reference to the accompanying figures.

FIG. 2 shows a Logarithmic plot of color intensity changes of a test stain, methyl red vs. time, according to Example 2. The color intensity prior to illumination was normalized to 100.

FIG. 3A shows a representative picture of a coated metal coupon, with the coating being an unstained $TiO_2$/resin.

FIG. 3B shows a representative picture of a coated metal coupon, with the coating being a $TiO_2$/resin stained with methyl red.

DEFINITIONS

Figure 1A:
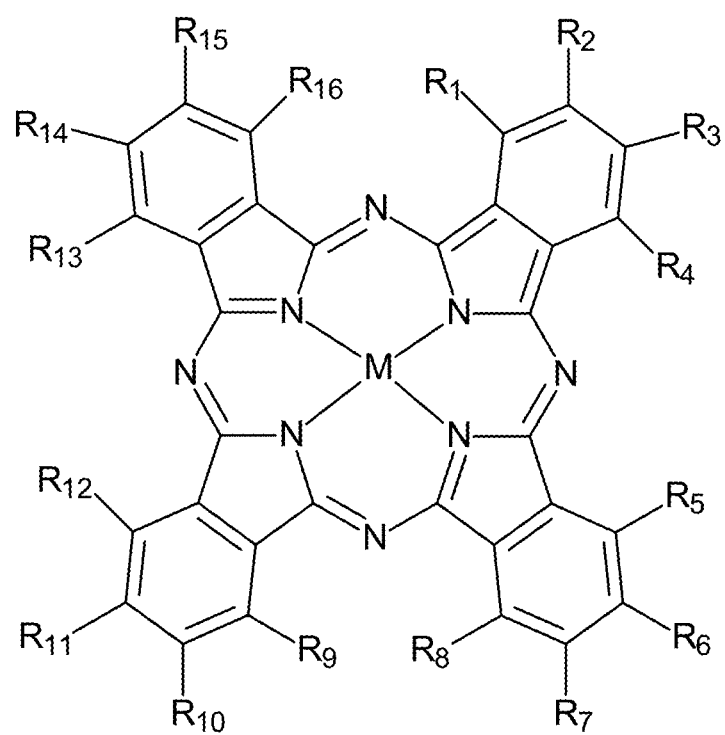
FIG. 1A shows the general chemical structure of an exemplary halogenated phthalocyanine according to one embodiment of the present invention.

Chemical elements are discussed in the present disclosure using their common chemical abbreviation, such as commonly found on a periodic table of elements. For example, hydrogen is represented by its common chemical abbreviation H; helium is represented by its common chemical abbreviation He; and so forth.

As used herein, the prefix "nano" refers to the nanometer scale (e.g., from about 1 nm to about 999 nm). For example, particles having an average diameter on the nanometer scale (e.g., from about 1 nm to about 999 nm, and more particularly from about 10 nm to about 150 nm) are referred to as "nanoparticles". Particles having an average diameter of greater than 1,000 nm (i.e., 1 μm) are generally referred to as "microparticles", since the micrometer scale generally involves those materials having an average size of greater than 1 micron, abbreviated 1 μm.

As used herein, the term "polymer" generally includes, but is not limited to, homopolymers; copolymers, such as, for example, block, graft, random and alternating copolymers; and terpolymers; and blends and modifications thereof. Furthermore, unless otherwise specifically limited, the term "polymer" shall include all possible geometrical configurations of the material. These configurations include, but are not limited to isotactic, syndiotactic, and random tacticity.

The term "organic" is used herein to refer to a class of chemical compounds that contain carbon atoms. For example, an "organic polymer" is a polymer that includes carbon atoms in the polymer backbone, but may also include other atoms either in the polymer backbone and/or in side chains extending from the polymer backbone (e.g., oxygen, nitrogen, sulfur, etc.).

As used herein, the term "related compounds thereof" refers to compounds that have the basic structure of the base compound with substituted atom(s) and/or substituted side groups, while still keeping the functionality of the base compound.

DETAILED DESCRIPTION

Reference now will be made to the embodiments of the invention, one or more examples of which are set forth below. Each example is provided by way of an explanation of the invention, not as a limitation of the invention. In fact, it will be apparent to those skilled in the art that various modifications and variations can be made in the invention without departing from the scope or spirit of the invention. For instance, features illustrated or described as one embodiment can be used on another embodiment to yield still a further embodiment. Thus, it is intended that the present invention cover such modifications and variations as come within the scope of the appended claims and their equivalents. It is to be understood by one of ordinary skill in the art that the present discussion is a description of exemplary embodiments only, and is not intended as limiting the broader aspects of the present invention, which broader aspects are embodied exemplary constructions.

Coating compositions are provided that produce robust coatings with aerobic photocatalytic activity against surface contaminants. For example, the coating compositions have been shown to provide robust coatings that effectively degrade a model dye (stain) upon illumination.

Generally, the coating composition includes halopigments dispersed within a polymeric binder (e.g., a silicon-containing polymeric binder). The halopigments generally include a photocatalytic halogenated phthalocyanine attached to a support particle (e.g., a metal oxide nanoparticle). Through substitution of halogen-carbon bonds in place of carbon-hydrogen bonds, a halogenated phthalocyanine can survive the reactive species created in the coating that would otherwise break down such an organic molecule.

In one particular embodiment, ternary compositions of fluorinated phthalocyanines-particle-polymers, are generally provided as new compositions of matter. The following discussion and enclosed examples demonstrate that the new compositions can be formed and that they exhibit photocatalytic reactivity superior to compositions that lack the fluorinated phthalocyanine components, i.e. binary compositions.

I. Halogenated Phthalocyanines

Phthalocyanine is an intensely colored aromatic macrocyclic compound that is widely used in dyeing. Phthalocyanines form coordination complexes with most elements of the periodic table, resulting in complexes that are also intensely colored and are used as dyes or pigments.

According to the present disclosure, the C—H bonds of a phthalocyanine dye are replaced with C—X bonds, where X is a halogen (e.g., F, Cl, Br, I), or with perhaloalkyl groups (e.g., the phthalocyanine is substituted with groups containing —$C_nX_m$, where is a halogen, n is an integer from 1 to 12, and m=2n+1). As such, halogenated phthalocyanine dyes (e.g., fluorinated phthalocyanines) have an absence of C—H bonds (i.e., are completely free from C—H bonds) while absorbing strongly light in the visible region of the solar spectrum, in contrast to titanium dioxides that can absorb light only in the UV or near UV regions or silicon dioxide which absorbs light only in the UV region.

In one embodiment, the halogenated phthalocyanine(s) contain C—F bonds in place of C—H bonds (i.e., fluorinated phthalocyanine(s)). Without wishing to be bound by any particular theory, it is believed that the stability of the fluorinated phthalocyanine is enhanced through its conjugated structure that allows the electrophilic F atoms to attract electrons from the central metal cation that the phthalocyanine coordinates. Thus, the C—F bonds may have increased bond strength, while the metal cation has an exaggerated positive charge, also known as enhanced Lewis acidity, which may increase the bond strength between the metal cation and the amine groups of the fluorinated phthalocyanine structure.

The following detailed description of such coating composition refers to the halogenated phthalocyanine as a fluorinated phthalocyanine. However, it is to be understood that other halogen species (e.g., Cl, Br, and I) can be included in the phthalocyanine either in place of, or in combination with fluorine. Thus, the halogenated phthalocyanine discussed herein is not intended to be limited to fluorinated phthalocyanine, which is discussed in greater detail below for simplicity purposes in teaching the various aspects and features of the present invention.

Generally, the halogenated phthalocyanine has the formula of Formula 1 below:

$$(16R\text{-}Pc)_nML_o \qquad \text{Formula 1}$$

where:

each R is, independently, a halogen (e.g., F, Cl, Br, I) or a perhaloalkyl group (e.g., a perfluoroalkyl group such as a perfluoro methyl group, a perfluoro ethyl group, a perfluoro propropyl group, etc.);

Pc is shorthand for a phthalocyanine compound;

1≤n≤2, which indicates is the number of phthalocyanine units in the complex;

M is a cation, such as a cationic metal ion (e.g., $Zn^{2+}$, $Mg^{2+}$, or any other divalent main group element, or a trivalent, main group element, such as $Al^{3+}$, or any other diamagnetic metal ion or 2 protons);

L is an additional species, cationic, anionic or neutral that may or may not coordinate with M and which, in certain embodiments, insures the overall electric neutrality of the complex; and o is the number of species L. In most embodiments, o is in the range of 0 to 8 (e.g., 1≤o≤8, such as 1≤o≤4). For example, L may be a coordinating, neutral solvent such as acetone, water, an amine etc. In addition, L groups that may coordinate the cation M insure overall charge neutrality, for example a hydroxy anion may coordinate an aluminum trivalent cation. It should be understood that L may represent multiple species, such as a solvent and a hydroxide anion, which can simultaneously coordinate an aluminum cation.

The compound of Formula 1 can be described structurally as shown in FIG. 1A. For simplicity, FIG. 1A shows a general chemical structure of a single phthalocyanine attached to a cation (i.e., n=1). However, it is to be understood that the structure of FIG. 1A is not limited to n=1. That is, $1 \leq n \leq 2$ as described with respect to Formula 1.

According to Formula 1 above and FIG. 1A, each R group is independently selected from the other R groups. Thus, one or more halogens can be bonded directly to the Pc molecule in combination with one or more perhaloalkyl groups. Thus, the halogenated phthalocyanine(s) compound can be more particularly described by Formula 2 below:

Formula 2 where:
Pc is shorthand for a phthalocyanine compound;
$1 \leq n \leq 2$, which indicates is the number of phthalocyanine units in the complex;
X is a halogen (such as F, Cl, Br, I);
$0 \leq m \leq 16$, which indicates the number of halogen atoms directly bonded to the phthalocyanine compound;
$R_x$ is a perhaloalkyl group (such as a perfluoroalkyl group), with each $R_x$ group being independent from any other $R_x$ groups in the molecule;
$0 \leq z \leq 16$, which indicates the number of perhaloalkyl groups;
$m+z=16$;
M is a cationic ion, such as a cationic metal ion (e.g., $Zn^{2+}$, $Mg^{2+}$, or any other divalent main group element, or a trivalent, main group element, such as $Al^{3+}$, or any other diamagnetic ion or 2 protons);
L is an additional species, cationic, anionic or neutral that may or may not coordinate M; and
o is the number of species L and may be chosen such that the overall charge of the complex is zero. In most embodiments, o is 0 to 8 (e.g., $1 \leq o \leq 8$, such as $1 \leq o \leq 4$) In addition, other groups may coordinate the cation in order to insure overall charge neutrality, for example a hydroxy anion may coordinate an aluminum trivalent cation. These groups are also represented by L.

Figure 1B:
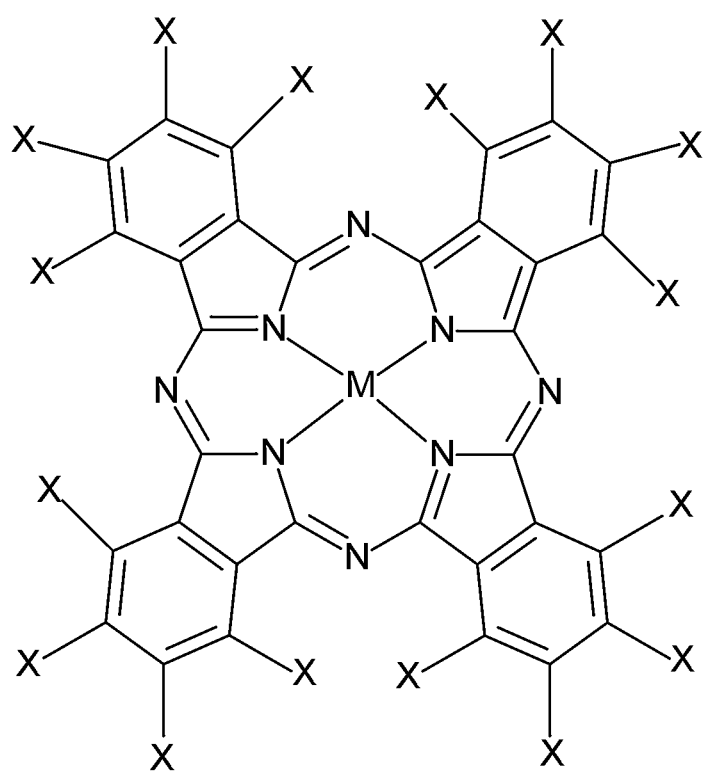
FIG. 1B shows the chemical structure of another exemplary halogenated phthalocyanine according to one embodiment of the present invention.

FIG. 1b shows one particular embodiment of the structure of FIG. 1A, where all of the R groups are a halogen. That is, each R is a halogen when referring to Formula 1 above, and z is 0 when referring to Formula 2 above with X being F.

It should be noted, as it is well known in the chemistry literature that in solution there is possible to have exchange of L groups in the presence of certain solvents and other species. Thus, formula 2 represents an average structure of several species that may coexist simultaneously. In contrast, as shown below, the chemical composition of materials in the solid-state is well defined as chemical exchanges are unlikely.

In solid-state, the halogenated phthalocyanine(s) of Formula 1 and shown in FIG. 1A can be represented by the general formula:

Formula 3 where:
each R is, independently, a halogen (e.g., F, Cl, Br, I) or a perhaloalkyl group (e.g., a perfluoroalkyl group such as a perfluoro methyl group, a perfluoro ethyl group, a perfluoro propropyl group, etc.);
Pc is shorthand for a phthalocyanine compound;
$1 \leq n \leq 2$;
M is a cationic ion, such as a cationic metal ion (e.g., $Zn^{2+}$, $Mg^{2+}$, or any other divalent main group element, or a trivalent, main group element, such as $Al^{3+}$, or any other diamagnetic metal or non-metal cation or 2 protons);
$1 \leq o \leq 8$, which is the number of L groups as defined above;
Q is a ligand attached to (e.g., ionic bonded, covalent bonded, etc.) the cationic ion M, which may be situated on one or both sides of the complex;
p is the number of components of an individual ligand in the complex;
$0 \leq q \leq 8$, which is the number of ligands in the complex (e.g., $0 \leq q \leq 4$);
Z is a counter-ion that renders the charge of the entire complex to zero, and can be an anion or a cation dependent on the charge to be balanced;
$0 \leq r \leq 8$, which is the number of counter-ions (Z) in the complex in the complex;
W is a molecule or molecules of solvation, such as a ketone, alcohol, amine, ester, etc); and
$0 \leq s \leq 40$, which is the number of molecules of solvation in the solid-state structure of the complex.

Similarly, the halogenated phthalocyanine(s) of Formula 2 can be represented by the general formula:

Formula 4 where:
Pc is shorthand for a phthalocyanine compound;
$1 \leq n \leq 2$, which indicates is the number of phthalocyanine units in the complex;
X is a halogen (such as F, Cl, Br, I);
$0 \leq m \leq 16$, which indicates the number of halogen atoms directly bonded to the phthalocyanine compound;
$R_x$ is a perhaloalkyl group (such as a perfluoroalkyl group), with each $R_x$ group being independent from any other $R_x$ groups in the molecule;
$0 \leq z \leq 16$, which indicates the number of perhaloalkyl groups;
$m+z=16$;
M is a cationic ion, such as a cationic metal ion (e.g., $Zn^{2+}$, $Mg^{2+}$, or any other divalent main group element, or a trivalent, main group element, such as $Al^{3+}$, or any other diamagnetic metal or non-metal ion or 2 protons);
$1 \leq o \leq 8$, which is the number of L groups as defined above;
Q is a ligand attached to (e.g., ionic bonded, covalent bonded, etc.) the cationic ion M, which may be situated on one or both sides of the complex;
p is the number of components of an individual ligand in the complex;
$0 \leq q \leq 8$, which is the number of ligands in the complex (e.g., $0 \leq q \leq 4$);
Z is a counter-ion that renders the charge of the entire complex to zero, and can be an anion or a cation dependent on the charge to be balanced;
$0 \leq r \leq 8$, which is the number of counter-ions (Z) in the complex in the complex;
W is a molecule or molecules of solvation, such as a ketone, alcohol, amine, ester, etc); and
$0 \leq s \leq 40$, which is the number of molecules of solvation in the solid-state structure of the complex.

Referring again to FIG. 1A, one particularly suitable embodiment of the halogenated phthalocyanine is described with each of $R_1$, $R_4$, $R_5$, $R_8$, $R_9$, $R_{12}$, $R_{13}$, and $R_{16}$, being a halogen (e.g., F) while each of $R_2$, $R_3$, $R_6$, $R_7$, $R_{10}$, $R_{11}$, $R_{14}$, and $R_{15}$ is, independently, a halogen or a perhaloalkyl group. For example, the groups $R_2$, $R_3$, $R_6$, $R_7$, $R_{10}$, $R_{11}$, $R_{14}$, and $R_{15}$ can be, independently, a perhalomethyl group (e.g., a perfluoromethyl group), a perhaloethyl group (e.g., a perfluoroethyl group), a perhalopropropyl group (e.g., iso-$C_3X_7$, perhalo isopropyl), etc.

One exemplary embodiment of a halogenated phthalocyanine is obtained from Formula 3 above when eight of the R groups are F and eight of the R groups are perfluoroisopropyl groups, n=1, M is Zn(II), o=1, p=0, q=0, r=0 and s=0. In this embodiment, the halogenated phthalocyanine contains 64 fluorine atoms: 1F in each of the eight R groups that are F and 7F in each of the eight perfluoroisopropyl groups, which leads to (1F*8)+(7F*8)=64F), and may be designated "$F_{64}PcZn$" in shorthand. This embodiment is easily understood with reference to Formula 2 above, where each X is F; m is 8; each $R_x$ is a perfluoroisopropyl group; z is 8; n=1, M is Zn(II), and o=1.

It should be noted that in the solid state the same composition exist, with reference to Formula 3 where eight of the R groups are F and eight of the R groups are perfluoroisopropyl groups, n=1, M=Zn(II), o=0, Q=methanol or acetone, p=2, q=1, r=0 and s=0. It is also known in the art that in solution ligands L and Q may exchange, thus the composition in solution is abbreviated $F_{64}PcZn$. Moreover, once a solvated fluorophthalocyanine is deposited on a particle support, including $TiO_2$, volatile molecules may evaporate, re-setting the p, q, r and s coefficients in Formula 3, possibly to zero. If the evaporation is incomplete, the coefficient may acquire fractional values. In any case, this variability does not significantly affect the functionality of the phthalocyanines and it is known in the art that heating the claimed compositions below their decomposition points, including under vacuum, may remove volatile molecules, thereby lowering further the values of p, q, r and s.

II. Support Particles

The application of halogenated phthalocyanines onto support particles (e.g., metal oxides and/or other oxides) results in the formation of new compositions, halopigments (HP) including fluoropigments (FP), which exhibit bonds not present within the oxide or halogenated phthalocyanines alone but show useful reactivity. For example, the fluoropigments exhibit the reactivity of fluorinated phthalocyanines and that of the material of the support particles, if any.

A variety of phases of oxides can be used, in various degrees of dispersion and particle size. For example, when the oxide includes $TiO_2$, the support particles can contain $TiO_2$ in large extent in an anatase crystalline form. For example, about 95% or more (by volume) of the titanium oxide particles can be in the anatase crystalline form.

The support particles can be in the form of microparticles and/or nanoparticles. As such, the support particles can have a size of about 10 nm to about 100 p.m. In one particular embodiment, the support particles are nanoparticles having an average size of about 10 nm to about 150 nm (e.g., about 10 nm to about 100 nm).

Without wishing to be bound by any particular theory, it is believed that the presence of the carbon-halogen bonds (and particularly the carbon-fluorine bonds, when present) in the phthalocyanine allows for van der Waals interaction between the halogenated phthalocyanine and the support particles (particularly when oxygen atoms are present, such as in oxides). In addition, it is also believed that an oxygen atom of the oxide support particles, which may have a slightly negative charge, interacts with the metal or non-metal cation of the halogenated phthalocyanine complex. Furthermore, when the phthalocyanine contains 2 protons instead of a central metal or non-metal, hydrogen bonding may link the protons to the surface of the supporting particle.

As stated, the support particles are, in one embodiment, formed from oxides, including but not limited to, silicon oxides (e.g., $SiO_2$), metal oxides (e.g., titanium oxides (e.g., $TiO_2$), aluminum oxide (e.g., $Al_2O_3$), zinc oxides (e.g., ZnO), iron oxides (e.g., FeO, $Fe_2O_3$, $Fe_3O_4$), zirconium oxides (e.g., $ZrO_2$), lanthanides oxides, etc.), or mixtures thereof. Other inert materials may be included in the support particles, either in addition to an oxide or in the alternative of an oxide. For example, the support particles may include carbon black, sulfides, carbonates, etc.

In one embodiment, the support particles include titanium oxide, which results in a combined activity of the titanium oxide and the halogenated phthalocyanine. Conversely, the use of an inert material in the support particles, such as silicon dioxide, results in a composition in which only the phthalocyanine plays a photocatalytic role. Thus, the superior photocatalytic properties of the halogenated phthalocyanines manifest themselves in the presence of supports, either inert or reactive.

III. Attaching the Halogenated Phthalocyanine to the Support Particle

The support particles can be loaded with the halogenated phthalocyanine, to form the halopigment, by first adding the support particles to a solution containing a solvent and the halogenated phthalocyanine and subsequently evaporating the solvent. In certain embodiments, the support particles can be loaded with the halogenated phthalocyanine at a concentration of about 0.1% to about 10% by weight of the total weight of the resulting halopigment.

IV. Polymeric Binder

Photocatalytic coatings can be prepared with many types of polymeric binders, but polysiloxanes polymers exhibit enhanced resistance to oxidative conditions of the type created by the presence of free radicals. The presence of silicon reduces the proportion of C—H bonds and thus the susceptibility to degradation. The addition of regular, i.e. carbon-based polymers may, in certain cases, provide beneficial mechanical and other properties, but at the expense of chemical robustness. The photo degradation is maximum when the energetic region of the spectrum is used to generate photocatalytic effects, i.e. when intense UV radiation is employed. Thus, the present invention, in which the phthalocyanine absorbs in the less-energetic region of the spectrum, namely the visible region, provides a method for minimizing radiation damage. As a key benefit, siloxane polymers provide coatings exhibiting excellent corrosion/biocorrosion resistance, including in industrial and marine environments. In particular, structural steel used for pipes, tank exteriors, and the like can be protected. Often a single coat may be sufficient, thus saving labor costs.

In one embodiment, the polysiloxane polymer can have the general formula $[R_2SiO]_n$, where R is an organic group (e.g., an alkyl group such as methyl, ethyl, or phenyl) and n is the average number of repeating units in the polymer. Such polysiloxanes polymers have an inorganic silicon-oxygen backbone (i.e., —Si—O—Si—O—Si—O—), with organic side groups attached to the silicon atoms. In some cases, organic side groups can be used to link two or more of these backbones together. By varying the —Si—O— chain lengths, side groups, and cross linking, polysiloxane polymers can be synthesized with a wide variety of properties and compositions.

The polymeric matrix is a complex mixture of silicon components and other ingredients known in the art to accommodate and be compatible with material of the support particles, and to form protective films and coatings on a variety of surfaces.

In one embodiment, the polymeric matrix can include one or more epoxy siloxane binders. Generally, such epoxy siloxane binders can include an epoxy-functional silicon compound component, such as an epoxysiloxane resin which includes at least one epoxy functional group, including two or more epoxy groups, with a polysiloxane backbone. A curing agent can be included with the epoxy siloxane binders. For example, the curing agent can have a nucleophilic group that is capable of reacting with the epoxy functional group to form a ring-opened product. In one embodiment of the invention, the curing agent is an amino polysiloxane Amino polysiloxanes typically include a linear or branched polymeric constituent having one or more polysiloxane chains and having at least one amino group.

Particularly suitable polysiloxane polymers are disclosed in U.S. Provisional Patent Application Publication No. 2011/0144225 of Stratton, et al., published on Jun. 16, 2011, which is incorporated by reference herein.

The coating compositions can include about 30% to about 95% of the polymeric binder by volume of the dry coating, such as about 40% to about 95%, about 50% to about 95%, or about 60% to about 95%. In other embodiments, the coating compositions can comprise about 30% to about 90% binder or about 40%, 50%, 60% or 70% to about 90% binder by volume of the dry coating.

V. Coating Composition

As stated, the coating composition includes a photocatalytic halogenated phthalocyanine supported on the support particles (i.e., the fluoropigment) and a silicon-containing polymer binder. In particular embodiments, the total fluoropigment concentration in the coating composition can be about 1% to about 70% by weight of the total dried weight of the coating, such as about 10% to about 50% by weight (e.g., about 10% to about 40% by weight). In one particular embodiment, the total fluoropigment concentration in the coating composition can be about 15% to about 35% by weight of the total dried weight of the coating, such as about 15% to about 35% by weight (e.g., about 20% to about 35% or about 15% to about 30%), preferably about 20% to about 30%.

An organic solvent can be mixed with the composition to effect the application of the composition to a surface as a coating. Suitable solvents include alcohols such as ethanol, ketones, esters, ethers, hydrocarbons etc. and mixtures thereof.

Other additives and compounds may be included in the coating composition, including, but not limited to, thickeners, dispersants, emulsifiers, viscosity modifiers, humectants, pH modifiers etc. For example, an optional alkaline extender, such as calcium carbonate, can be included in the coating composition. Surfactants can also be present in the coating composition to help stabilize the coating composition prior to and during application. Viscosity modifiers can be present in the coating composition.

The coating composition may be applied to the substrate by known coating techniques, for example, dipping, spraying, painting with a brush, etc.

Figure 4:
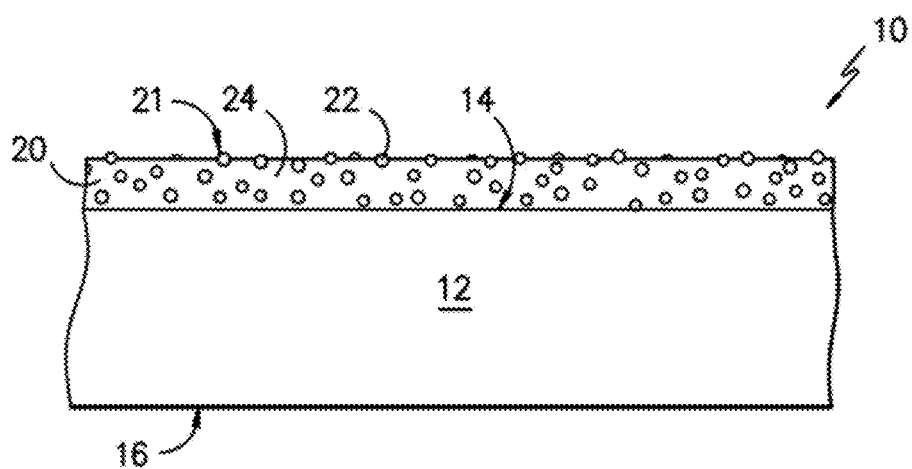
FIG. 4 shows a cross-section schematic of an exemplary coating composition applied onto a substrate.

Referring to FIG. 4, an exemplary coated article 10 is generally shown including a substrate 10 defining a first surface 12 and a second, opposite surface 14. The coating 20, formed from the coating composition, is positioned on the first surface 12 of the substrate 10, and may be positioned on the opposite surface 14 if desired. The coating composition may be applied to the substrate 12 by known coating techniques, for example, dipping, spraying, painting with a brush, etc. A variety of substrates 12 can be coated with the coating composition, such as metal surfaces (e.g., steel), aluminum, as well as alloys, etc.

The coating 20 is shown including a plurality of metal oxide supports 22 with halogenated phthalocyanine on its surface 21, as described in greater detail above. The metal oxide supports 22 are dispersed within a polymeric binder 24 to form the coating 20, as described in greater detail above. It is to be understood that the schematic shown in FIG. 4 is not to scale, and included only for visualization purposes.

EXAMPLES

Fluorinated phthalocyanines-titanium dioxide compositions associated with polymeric, silicon resins have been obtained. These compositions were shown to produce metal coatings with enhanced photocatalytic degradation effects when compared with the effects of titanium dioxide compositions alone.

Example 1

Synthesis of $F_{64}PcZn/TiO_2$ $F_{64}PcZn$ is defined as per FIG. 1a, with $R_1=R_4=R_5=R_8=R_9=R_{12}=R_{13}=R_{16}=F$; $R_2=R_3=R_6=R_7=R_{10}=R_{11}=R_{14}=R_{15}=iso-C_3F_7$ (perfluoro isopropyl); and $M=Zn(II)$. $F_{64}PcZn$ was prepared as per "Introduction of Bulky Perfluoroalkyl Groups at the Periphery of Zinc Perfluoro Phthalocyanine: Chemical, Structural, Electronic, and Preliminary Photophysical and Biological Effects," B. Bench, A. Beveridge, W. Sharman, G. Diebold, J. van Lier, S. M. Gorun, *Angew. Chem. Int. Ed.*, 41, 748, 2002. Commercially available $TiO_2$ nanoparticles with particle size of about 10-12 nm were loaded with 3 wt % of $F_{64}PcZn$. The loading was performed by adding $TiO_2$ nanoparticles to $F_{64}PcZn$ dissolved in ethanol and the subsequent evaporation of the solvent. The amount of $F_{64}PcZn$ loaded on $TiO_2$ nanoparticles was confirmed using UV-Vis spectrophotometric measurements.

Example 2

Reactivity in Solution of $F_{64}PcZn/TiO_2$

Photodegradation of methyl red, 2-(N,N-Dimethyl-4-aminophenyl)azobenzenecarboxylic acid. Methyl red is a dye used in testing the ability of photocatalysis to produce reactive oxygen species. The loss of its color indicates the production of the desired reactive species. An aqueous methyl red solution with concentration of 0.001 mM was used. To this solution, FP1 was added resulting in a suspension. The ratio of $TiO_2$ and $F_{64}PcZn/TiO_2$ to methyl red was 1:10. The light from a mercury lamp, with an intensity equivalent of that of 3 Suns was used to illuminate the suspension. The suspension was stirred at a constant speed and the catalyst was separated via centrifugation at the end of the reaction. $TiO_2$ alone was used in a control experiment using the same conditions. The methyl red solution concentration was measured periodically using a UV-Vis spectrophotometer.

The results, shown in FIG. 2, show that $TiO_2$ has only a minimum bleaching effect on the methyl red, while $F_{64}PcZn/TiO_2$ decomposes it rapidly. It was found that only about 10% of the original methyl red remained after 4 hours in the presence of $F_{64}PcZn/TiO_2$. In contrast, over 95% of the original methyl red remained in the absence of the phthalocyanine component of $F_{64}PcZn/TiO_2$.

Example 3

Coatings Formulation

The general procedure for coating formulations is shown in Table 1.

TABLE 1

| PART A | |
| --- | --- |
| Silikopon EF (Siloxane-Epoxy Resin) | 26 g |
| Tiona ® 595 Rutile TiO$_2$ (Pigment TiO$_2$) | 14 g-X g |
| F$_{64}$PcZn/TiO$_2$ (Example 1) | X g |
| Xylene | 2.1 g |
| PART B | |
| Dynasylan AMEO (aminosilane curing agent) | 6.5 g (4:1 ratio to Silikopon EF) |

In the preparation procedure, Silikopon EF resin was contacted with Xylenes and the mixture was homogenized by mixing it with a shear blade for 5 minutes. For control experiments, Tiona® 595 (rutile TiO$_2$) was added slowly and the mixing speed was increased as needed to fully incorporate the ingredients. A similar procedure was used when FP1 was used, but Tiona® 595 (rutile TiO$_2$) was added as well in order to maintain to total amount of pigment constant to 14 g. The mixing rate was increased next to 3000 RPM and disperse/grind for 30 min. When ready to apply the coating, Dynasylan AMEO was added and mixed with a spatula. This formulation give ~10% Pigment Volume Concentration (PVC). The amount of FP1, X in Table 1, was varied as needed. The amount of FP1 added was typically around 1.15 grams.

Example 4

Coatings Application Procedure

Steel Q-panels Type R, general purpose sheet metal were used for applying coatings using a #52 wire coater that gives a ~100 micron (4 mil) wet film thickness. FIG. 3 shows the appearance of coated panels. For photocatalytic dye decomposition testing, the panels were soaked in 0.5 mmol methyl red aqueous solutions for 10 minutes and then dried in air (see, FIGS. 3A and 3B).

Example 5

Solid-State Reactivity of F$_{64}$PcZn/TiO$_2$ Containing Coatings

The coated panels, unstained and stained with methyl red as shown in FIGS. 3A and 3B, were exposed to UV light for up to 6 hours. The photocatalytic degradation was monitored by measuring the Δb*, the time-dependent change in the yellowness of film, using a DataColor 400 spectrophotometer.

TABLE 2

Methyl Red relative degradation as indicated by Δb*

| Sample | Δb*, after illumination time in minutes | | | | |
| --- | --- | --- | --- | --- | --- |
| | 0 | 15 | 95 | 240 | 360 |
| Rutile ~10% PVC | 0 | NA | −5.7 | −8.8 | NA |
| P25 ~1% PVC, Rutile ~9% PVC | 0 | −3.50 | −6.8 | −9.5 | −12.8 |
| F$_{64}$PcZn (3% w/w) on P25 ~1% PVC Rutile ~9% PVC | 0 | −7.5 | −12.6 | −20.1 | −27.7 |

The data of Table 2 indicates that the P25 phase, at about 1% PVC load showed only slightly more color change than the non-active sample containing rutile only. In contrast, the F$_{64}$PcZn/TiO$_2$ containing coating composition, obtained by the use of P25 as support and 3% w/w exhibits roughly double the extent of photoactivity compared to P25 alone, viz. 20.1 vs. 9.5, respectively. This observation is consistent with the methyl red degradation effects of F$_{64}$PcZn/TiO$_2$ when suspended in solution, in the absence of the polymeric resin, as discussed in Example 2.

These and other modifications and variations to the present invention may be practiced by those of ordinary skill in the art, without departing from the spirit and scope of the present invention, which is more particularly set forth in the appended claims. In addition, it should be understood the aspects of the various embodiments may be interchanged both in whole and in part. Furthermore, those of ordinary skill in the art will appreciate that the foregoing description is by way of example only, and is not intended to limit the invention so further described in the appended claims.

What is claimed:

1. A coating composition, comprising:
   a halopigment comprising a halogenated phthalocyanine attached to a support particle; and
   a silicon-containing polymeric matrix, wherein the halopigment is dispersed within the silicon-containing polymeric matrix.

2. The coating composition of claim 1, wherein the halogenated phthalocyanine is free from carbon-hydrogen covalent bonds.

3. The coating composition of claim 1, wherein the halogenated phthalocyanine is a fluorinated phthalocyanine.

4. The coating composition of claim 1, wherein the halogenated phthalocyanine has the formula:

$$(16R\text{-Pc})_n ML_o$$

where:
   each R is, independently, a halogen or a perhaloalkyl group, with each R group being independent from the other groups;
   Pc is a phthalocyanine compound;
   $1 \leq n \leq 2$;
   L is a ligand or ligands and M is a cation; and
   $0 \leq o \leq 8$.

5. The coating composition of claim 4, wherein the halogenated phthalocyanine has the formula:

$$[X_m(R_x)_z Pc]_n ML_o$$

where:
   Pc is a phthalocyanine compound;
   $1 \leq n \leq 2$;
   X is a halogen;
   $0 \leq m \leq 16$;
   R$_x$ is a perhaloalkyl group;
   $0 \leq z \leq 16$;
   m+z=16;
   L is a ligand and M is a cation; and
   $0 \leq o \leq 4$.

6. The coating composition of claim 1, wherein the halogenated phthalocyanine has a chemical structure:

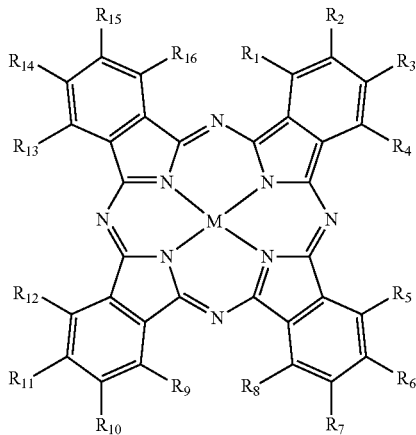

where
$R_1$, $R_4$, $R_5$, $R_8$, $R_9$, $R_{12}$, $R_{13}$, and $R_{16}$, are, independently, a halogen; and
$R_2$, $R_3$, $R_6$, $R_7$, $R_{10}$, $R_{11}$, $R_{14}$, and $R_{15}$ are, independently, a perhaloalkyl group.

7. The coating composition of claim 6, wherein $R_1$, $R_4$, $R_5$, $R_8$, $R_9$, $R_{12}$, $R_{13}$, and $R_{16}$, are fluorine.

8. The coating composition of claim 7, wherein $R_2$, $R_3$, $R_6$, $R_7$, $R_{10}$, $R_{11}$, $R_{14}$, and $R_{15}$ are perfluoroalkyl groups.

9. The coating composition of claim 8, wherein at least one of $R_2$, $R_3$, $R_6$, $R_7$, $R_{10}$, $R_{11}$, $R_{14}$, and $R_{15}$ is a perfluoroisopropyl group.

10. The coating composition of claim 1, wherein the support particle comprises a metal oxide.

11. The coating composition of claim 10, wherein the metal oxide is titanium oxide, and wherein about 95% by volume or more of the titanium dioxide in the support particle has an anatase crystalline form.

12. The coating composition of claim 1, wherein the coating composition includes about 1% to about 10% by volume of the halopigment, and wherein the support particles have an average size of about 10 nm to about 150 nm.

13. The coating composition as in claim 1, wherein the silicon-containing polymeric matrix comprises a polysiloxane polymer.

14. A coated substrate, comprising
a substrate defining a first surface; and
a coating applied onto the first surface, wherein the coating comprises the dried coating composition according to claim 1.

15. A method of forming a coating composition, the method comprising:
dissolving a halogenated phthalocyanine in a solvent to form a solution;
adding a plurality of support particles into the solution; thereafter, evaporating the solvent from the solution to form a plurality of halopigments, wherein the halopigments comprise the halogenated phthalocyanine attached to the support particle; and
dispersing the halopigment within a silicon-containing polymeric matrix to form the coating composition.

16. The method as in claim 15, wherein the halogenated phthalocyanine has the formula:

$$(16R\text{-}Pc)_n ML_o$$

where:
each R is, independently, a halogen or a perhaloalkyl group, with each R group being independent from the other groups;
Pc is a phthalocyanine compound;
$1 \leq n \leq 2$;
L is a ligand or ligands and M is a cation; and
$0 \leq o \leq 8$.

17. The method as in claim 16, wherein the halogenated phthalocyanine has a chemical structure:

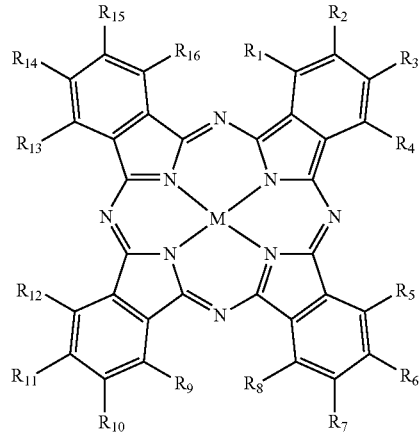

where
$R_1$, $R_4$, $R_5$, $R_8$, $R_9$, $R_{12}$, $R_{13}$, and $R_{16}$, are, independently, a halogen; and
$R_2$, $R_3$, $R_6$, $R_7$, $R_{10}$, $R_{11}$, $R_{14}$, and $R_{15}$ are, independently, a perhaloalkyl group.

18. The method as in claim 15, wherein the coating composition includes about 1% to about 10% by volume of the halopigment, and wherein the support particles have an average size of about 10 nm to about 150 nm.

19. The method as in claim 15, wherein the support particles are added at a concentration such that the resulting halopigment includes the halogenated phthalocyanine at about 0.1% to about 10% by weight of the total weight of the resulting halopigment.

20. The method as in claim 15, wherein the silicon-containing polymeric matrix comprises a polysiloxane polymer.

* * * * *